Nov. 8, 1927.
M. L. BAYLEY
1,648,531
RESTAURANT EQUIPMENT
Filed Nov. 1, 1926
3 Sheets-Sheet 1
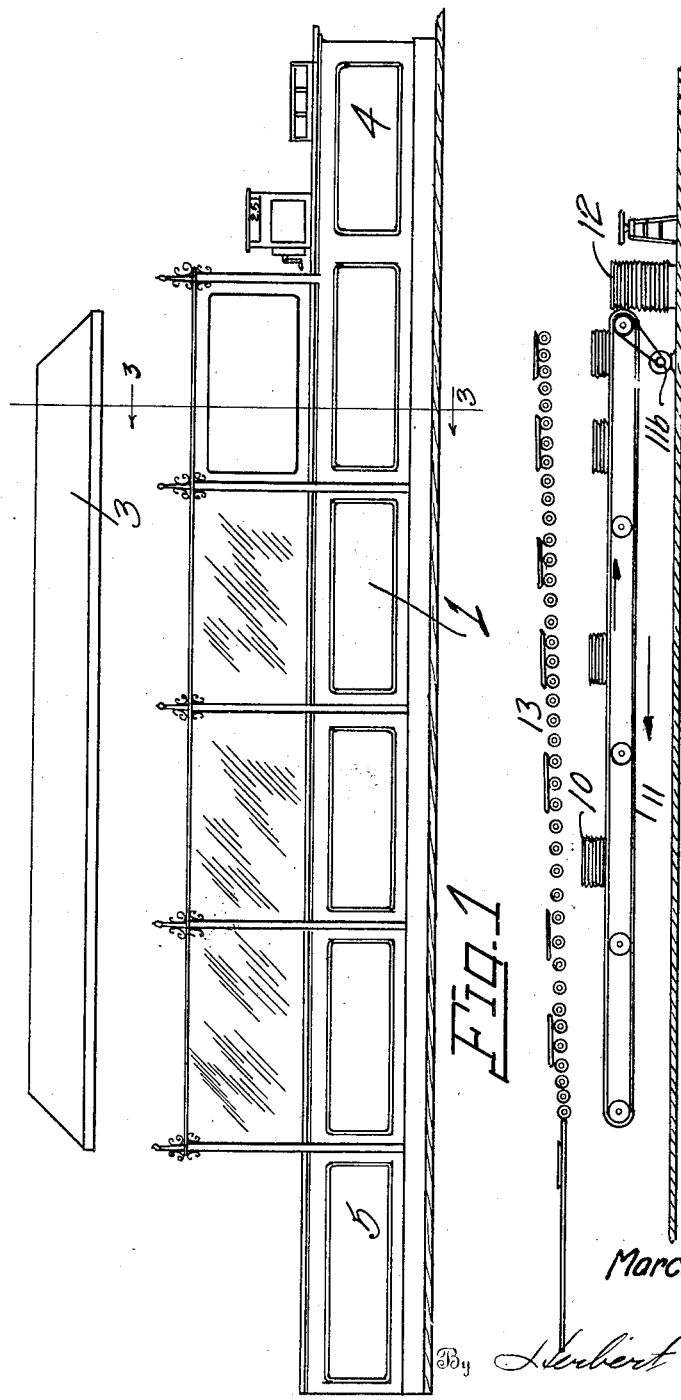
Inventor
Marcus L. Bayley
By Herbert E. Smith,
Attorney

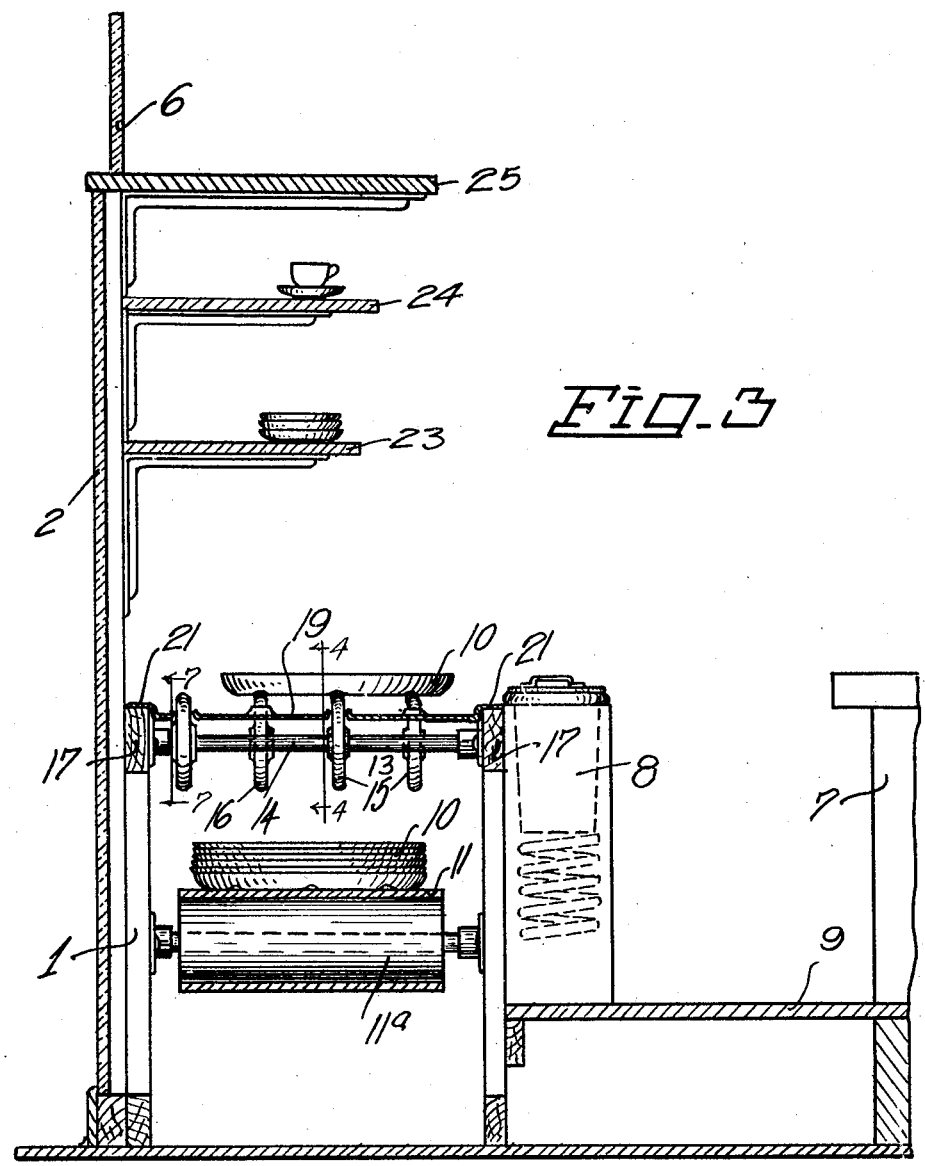

Nov. 8, 1927.
M. L. BAYLEY
1,648,531
RESTAURANT EQUIPMENT
Filed Nov. 1. 1926
3 Sheets-Sheet 3
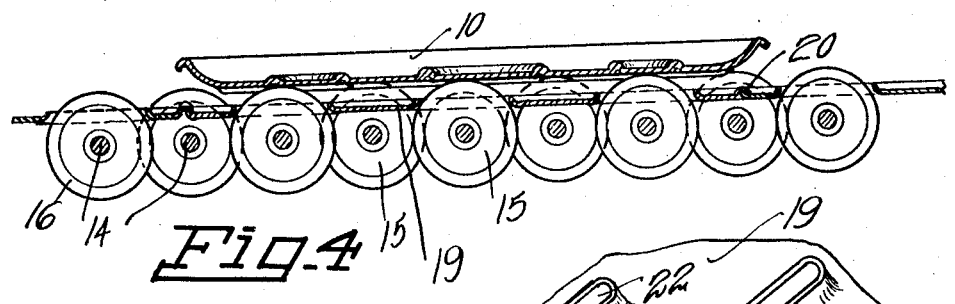
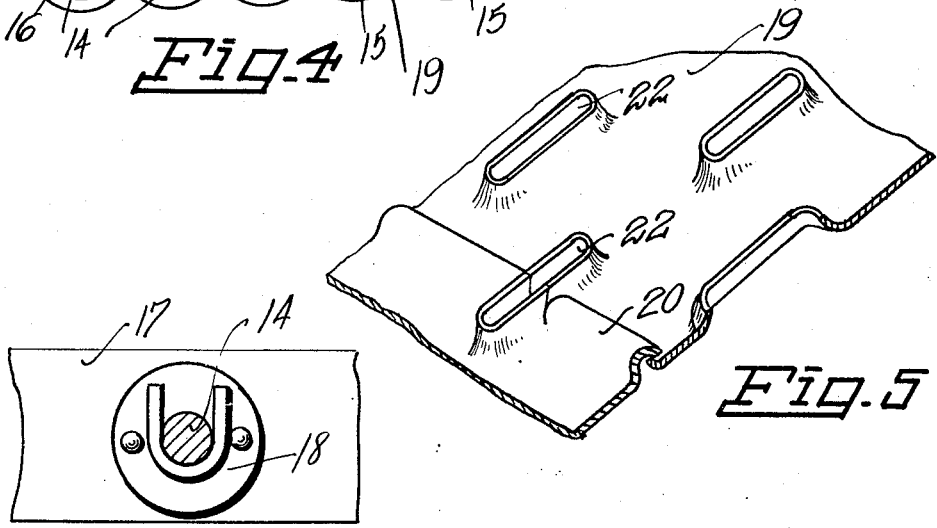
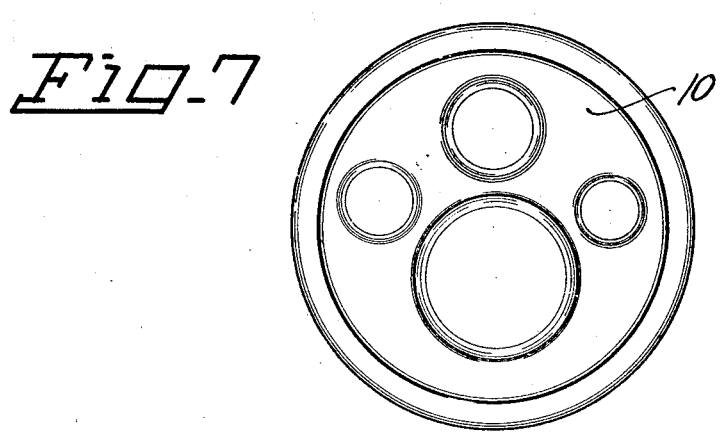
Inventor
Marcus L. Bayley
By Herbert E. Smith
Attorney Patented Nov. 8, 1927.

1,648,531

UNITED STATES PATENT OFFICE.

MARCUS L. BAYLEY, OF SPOKANE, WASHINGTON.

RESTAURANT EQUIPMENT.

Application filed November 1, 1926. Serial No. 145,580.

My present invention relates to improvements in restaurant equipment or dining room service for carrying dishes, trays, or platters of food from the place of preparation of the food, or from a kitchen to the place of serving the food, or to a dining room. By the utilization of the equipment of my invention, the patron of the restaurant, dining room, or lunch room, may give his order to the cashier and pay for the order as it is given. The cashier then fills out an order blank or check by designating thereon the foods desired and paid for by the patron, deposits the order on a suitable tray, platter or other receptacle, places the tray and order on a conveyer and the tray with its order is conveyed to the place of preparation of the foods. Attendants stationed along the path of the moving tray, successively supply the articles or foods designated on the order and place them on the tray until the order is filled, and the tray with its filled order thereon is finally discharged or delivered to the patron at a point located at a convenient distance from the cashier's desk. By the combination and arrangement of parts of the equipment of my invention, confusion is avoided in serving foods, a large number of patrons may quickly be served in an orderly manner, and the orders for meals may with accuracy be filled to insure quick and reliable service.

In carrying out my invention I locate the stoves or cooking ranges, steam table, conveyers and other equipment in compact arrangement whereby the various foods, trays, dishes, cups, etc., are readily accessible to the attendants and comparatively small space or area is occupied in the dining room, or a space for this purpose adjoining the dining room may be utilized. The invention consists in certain novel combinations and arrangements of parts as will hereinafter be more fully set forth, for carrying out my invention. In the accompanying drawings I have illustrated one complete example of the physical embodiment of my invention wherein the parts of the equipment are combined and arranged according to one mode I have thus far devised for the practical application of the principles of my invention.

Figure 1 is a view in elevation of the service counter showing the cashier's desk at the right where the order is given and the service counter or table at the left where the filled order is furnished to the patron.

Figure 2 is a diagrammatic view in elevation showing a declining roller-conveyer for the trays as the orders are filled, together with an endless conveyer for supplying empty trays to the cashier's desk.

Figure 3 is an enlarged, transverse vertical sectional view at line 3—3 of Figure 1 through the service furniture showing also a steam table and part of a cooking range or stove.

Figure 4 is an enlarged detail vertical sectional view at line 4—4 of Figure 3 showing a portion of the roller-conveyer and a tray thereon.

Figure 5 is a perspective detail view of a portion of the protecting or cover-plate for the roller-conveyer.

Figure 6 is a plan view of one of the service trays or platters used with the equipment.

Figure 7 is a detail view at line 7—7 of Figure 3 showing one of the end roller bearings with a journal shown in section.

In a preferred form of the invention as illustrated in Figure 1 the equipment may be located at one side of a dining room where a counter 1 of suitable type is utilized, and an opaque screen 2 may be used in front of the counter and ornamented in approved manner. In Figure 1 a canopy 3 is shown located in position to ventilate the space occupied by the equipment for the convenience and comfort of the patrons and attendants. At the right end in Figure 1 the cashier's desk is indicated at 4 and at the left end of the counter in this figure of drawing the service table 5 is located at which the patron receives the tray or platter laden with his order, which has previously been supplied to the cashier at the desk 4. A transparent panel 6 of glass or other material is shown in Figure 3 above the counter, and in this figure a portion of a cooking range 7 and a steam table 8 are illustrated in convenient location for the attendants who stand behind the counter on the elevated floor 9.

A tray or platter 10, with depressions or pockets therein for various foods, is shown in plan view in Figure 6, and these empty trays are supplied to the cashier's desk by means of an endless conveyer 11 located beneath the counter and extending longitudinally thereof. The conveyer is provided with end rollers 11ᵃ and a motor indicated at 11ᵇ in Figure 2 is employed to operate it. The empty trays are carried on the upper flight of the conveyer belt 11 toward the cashier's desk as indicated by the arrows, and piled in a stack 12 for convenient access of the cashier.

The patron is expected to give his order to the cashier who designates the articles or foods on an order blank or check, and the order is paid for at the time given. The patron then passes to the left end of the counter, stops at the service table 5, and the tray with his filled order that has been conveyed along the counter at the rear of the screen 2, is delivered to the patron at this table.

After making out the order the cashier places a tray with the filled order blank, or check, on a roller conveyer indicated as a whole by the numeral 13, which as shown declines towards the service table 5 and extends longitudinally of the counter back of the screen 2. The tray may move by gravity, or be passed along from one attendant to another while resting on the roller conveyer, each attendant supplying one or more foods as designated on the order blank or check. When the tray reaches the last attendant at the left in Figure 1 the order will have been filled and the laden tray is furnished to the patron.

The roller conveyer comprises a series of parallel shafts 14 each having a plurality of wheels 15 thereon and provided with rubber or cushion rims as 16. As here shown the wheels are arranged in pairs on their axles or shafts and staggered, and the parallel shafts or axles are spaced apart sufficiently to permit the rims of the wheels of adjoining axles to overlap, thus providing an adequate surface over which the tray may glide or be shifted longitudinally of the conveyer.

For sanitary purposes the rollers and their axles may readily be removed, cleansed and replaced at required intervals, and for this purpose a pair of spaced side plates 17, that extend longitudinally of the counter, are utilized in connection with pairs of U-shaped bearing plates 18 for the respective journal ends of the axles or shafts. These bearing plates are attached in suitable manner to the side plates, and the U-shaped bearings of the plates permit the journals or ends of the shafts to be placed therein and removed therefrom with facility when required.

To protect or shield the conveyer from waste that may spill or fall from the trays or from other sources, a cover plate 19 is used. This cover plate is made up of readily removable sections having overlapping complementary ends 20 as best seen in Figure 5, and the side edges of these sections are fashioned with complementary, parallel supporting flanges 21, 21 adapted to rest upon the spaced side bars of the counter 1. Each section is provided with a number of slots 22 having upwardly projecting walls stamped or otherwise fashioned in the plates. The slots are staggered in their arrangement to register with the wheels of the roller-conveyer and the plates as illustrated are supported in such manner as to permit only the upper portions of the wheels or rollers to project through these slots. The whole structure of the conveyer including the wheels, their shafts and the plate or cover sections, may readily be dismantled, in order that the operating parts may be cleansed and readily replaced.

The trays as they glide or are shifted over the top surface of the roller-conveyer are filled by the attendants who stand on the elevated floor 9, and shelves as 23, 24 and 25 are arranged in position for convenient access of the attendants, for supplying the order. The silverware, chinaware, foods, and other requisites are thus supplied by the attendants and placed on the trays as they successively pass along the conveyer, and the cooking range and steam table are within easy reach so that no time will be lost in preparing and filling the order. After the trays have been used by the patrons they are gathered, cleansed, and returned to the cashier's desk by the endless conveyer 11 as indicated.

While I have shown one exemplification of the installation of my equipment it will be apparent that other arrangements may be made and are contemplated whereby the invention may be carried out without departing from, the principles thereof as set forth in my appended claims.

Having thus fully described my invention, what I claim as new and desire to secure by Letters Patent is—

1. A restaurant equipment comprising a counter having an order desk at one end and a service table at the other end, a conveyer for supplying trays at the order desk, a second conveyer for said trays between the order desk and service table, and sources of supply for foods and equipment disposed adjacent to said second conveyer.

2. A restaurant equipment comprising a counter, an order desk and a spaced service table, a gravity actuated conveyer for trays disposed between said desk and table, and sources of supply for foods and equipment disposed adjacent to said conveyer.

3. A restaurant equipment comprising a counter, an order desk and a spaced service table, a gravity actuated conveyer for trays comprising side plates extending longitudinally between said desk and table, a series of removable, parallel axles journaled in said plates and a plurality of wheels on each axle forming a conveyer surface, and sources of supply for foods and equipment disposed adjacent to said conveyer.

4. The combination with a counter, an order desk and spaced service table, of a pair of side plates having bearing plates, removable axles in said bearing plates and a plurality of roller-wheels on each axle, sectional cover plates having overlapping flanges and side flanges supported on said counter, said plates having slots for said wheels, and sources of supply for food and equipment disposed adjacent to said roller-wheels.

In testimony whereof I affix my signature.

MARCUS L. BAYLEY.